Dec. 17, 1935.  J. F. CRAIG  2,024,628
APPLICATION AND RELEASE VALVE DEVICE
Filed Dec. 1, 1933
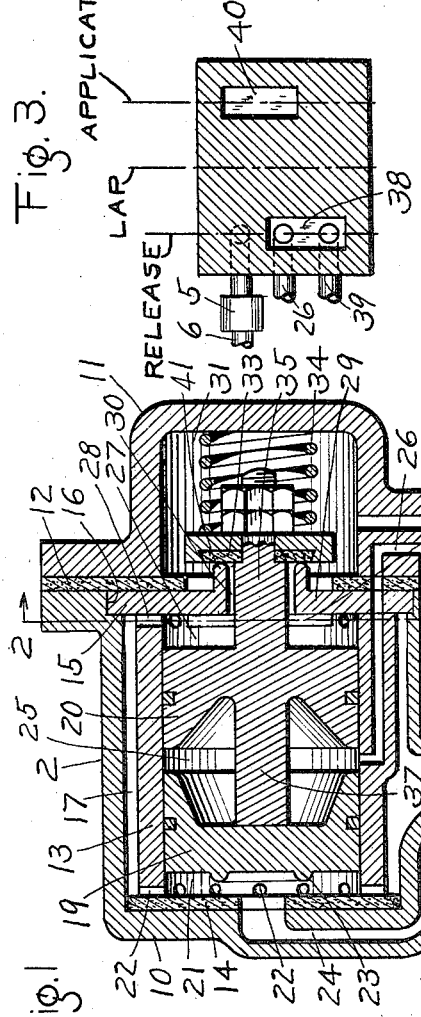
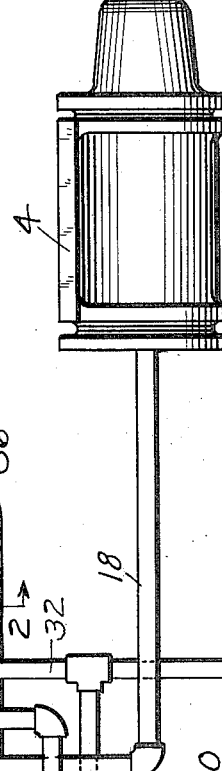
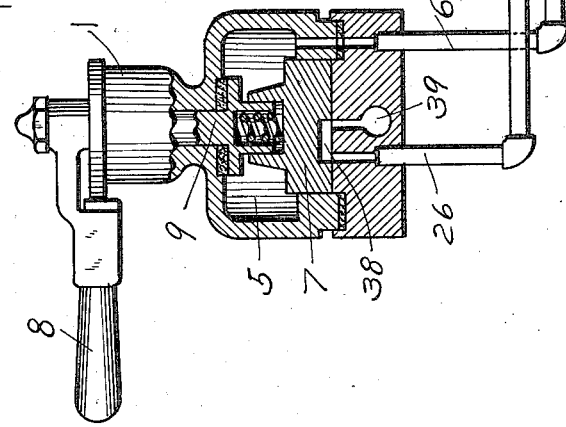
INVENTOR.
JOHN F. CRAIG
BY  Wm. M. Cady
ATTORNEY.

Patented Dec. 17, 1935

2,024,628

UNITED STATES PATENT OFFICE 2,024,628

APPLICATION AND RELEASE VALVE DEVICE

John F. Craig, Upper Montclair, N. J., assignor to The Westinghouse Air Brake Company, Wilmerding, Pa., a corporation of Pennsylvania Application December 1, 1933, Serial No. 700,468

2 Claims. (Cl. 303—69)

This invention relates to fluid pressure brakes and the principal object is to provide an improved valve device for supplying and releasing fluid under pressure to and from a brake cylinder, whereby the brakes on a car may be quickly applied and released.

Other objects and advantages will appear in the following more detailed description of the invention.

In the accompanying drawing; Fig. 1 is a diagrammatic view, mainly in section, of a fluid pressure brake equipment embodying a quick application and release valve device constituting the invention; Fig. 2 is a sectional view taken on the line 2—2 of the quick application and release valve device shown in Fig. 1; and Fig. 3 is a diagrammatic development view of the brake valve device shown in Fig. 1.

The fluid pressure brake equipment shown in Fig. 1 comprises a brake valve device 1, a quick application and release valve device 2, a main reservoir 3 and a brake cylinder 4.

The brake valve device 1 is of the usual construction comprising a casing having a chamber 5 connected to a passage 6 leading to the main reservoir 3, and containing a rotary valve 7 adapted to be turned to various brake controlling positions by means of a handle 8 operatively connected to said rotary valve through the medium of an operating shaft 9.

The quick application and release valve device 2 comprises a casing consisting of a body member 10 having a chamber open at one end, and a cover member 11 secured to said body member and closing the open end of said chamber, a gasket 12 being interposed between said members.

A bushing 13 is contained in the chamber in the body member 2 and is interposed between gasket 12 and a gasket 14 disposed against the closed end of said chamber. The bushing 13 is provided adjacent the outer end with an annular collar 15 having a sliding fit with surface 16 of a recess formed in the body member 2 for positioning said bushing in said body member so as to form around said bushing an annular chamber 17 which is connected to a pipe 18 leading to the brake cylinder 4.

The bushing 13 is provided with an axial bore in which are slidably disposed a release piston 19 and an application piston 20. The release piston 19 has at one side a chamber 21 open through a plurality of radial, spaced passages 22 in the bushing 13 to the brake cylinder chamber 17, said piston being provided with an annular seat rib 23 adapted to engage and seal against the gasket 14 for closing communication from chamber 21 to an atmospheric exhaust passage 24. The seat rib 23 is of such length, that when it engages the gasket 14, the plurality of passages 22 through the bushing 13 will not be lapped by the piston 19.

A chamber 25 is formed between the pistons 19 and 20 and is connected to a passage and pipe 26 leading to the brake valve device 1, while a chamber 27 is provided at the outer face of the application piston 20 and is connected through a plurality of radial passages 28 in the bushing 13 to the brake cylinder chamber 17.

A wall 29 is provided in the right hand end of the bore through bushing 13 and a passage 30 is provided through said wall to connect chamber 27 to a chamber 31 which is provided in the cover member 11 and connected to a passage and pipe 32 leading to the main reservoir pipe 6. A seat rib 41 is provided on the wall 29 around the passage 30 within chamber 31, and a poppet type application valve 33, contained in chamber 31, is normally pressed into sealing engagement with the seat rib 41 by means of a spring 34, so as to close communication from the main reservoir chamber 31 to chamber 27.

The application valve 33 is preferably carried on a stem 35 which projects from the application piston through passage 30 in wall 29, said stem being of such length as to prevent the application piston lapping passage 26 when the application valve 33 is seated against the seat rib 41. The wall 29 is provided on the left hand side with a plurality of raised portions 36 adapted to be engaged by the application piston 20, upon full movement of said piston towards the right hand, to prevent said piston closing communication through the passages 28 in the bushing 13.

The application piston 20 is provided on the left hand side with a stem 37 adapted to limit movement of the release piston 19 toward the right hand, so that said piston will not lap passage 26.

According to the preferred construction, the bushing 13, which contains the pistons 19 and 20, and the application valve 33 carried by the piston 20, may be removed from or restored to the body member 10 manually, as a unit, when the cover member 11 and gasket 12 are removed. This facilitates cleaning of the device or renewal of parts of the device which may become worn excessively, without having to interfere with or remove the body member 10 from the pipes 32, 26 and 18.

In operation, fluid under pressure is supplied to the main reservoir 3 in the usual well known manner, and from thence flows through pipe 6 to rotary valve chamber 5 in the brake valve device 1, and from pipe 6 through pipe 32 to the application valve chamber 31.

With the brake valve device 1 in the normal or running position, as shown in Fig. 1, the chamber 25 between the application piston 20 and release piston 19 is open to the atmosphere through passage and pipe 26, a cavity 38 in the rotary valve 7 and from thence through an atmospheric passage 39. With the chamber 25 thus vented and the application piston 20 in the normal position, the application valve 33 is seated by the action of spring 34 and main reservoir pressure acting in chamber 31, while with the release piston 19 in the normal position, the brake cylinder 4 is open to the atmosphere through pipe and passage 18, chamber 17 in the quick application and release valve device, through the plurality of passages 22 in the bushing 13, chamber 21 and from thence through the atmospheric exhaust passage 24.

If it is desired to effect an application of the brakes, the brake valve handle 8 is operated to turn the rotary valve 7 to application position, in which a port 40 in the rotary valve establishes communication between the application and release pipe 26 and the rotary valve chamber 5, as shown in Fig. 3 of the drawing. Fluid supplied from the main reservoir 3 to the rotary valve chamber 5 now flows through port 40 and pipe 26 to the chamber 25 between the application and release pistons 20 and 19 and urges said pistons away from each other. Due to the pressure acting to seat the application valve 33, which thereby opposes outward movement of the application piston 20, the release piston 19 is first operated and is moved to the position in which the seat rib 23 seals against gasket 14. Then when the pressure obtained in chamber 25 slightly exceeds the pressure acting to seat the application valve 33, the application piston 20 is moved toward the right hand and thereby moves said application valve away from the seat rib 41.

With the application valve 33 unseated, fluid supplied from the main reservoir to chamber 31 flows to chamber 27 and from thence through the plurality of passages 28, chamber 17 and pipe 18 to brake cylinder 4, thus applying the brakes.

If it is desired to limit the degree of pressure thus obtained in the brake cylinder 4 to less than the pressure carried in the main reservoir 3, then, when the pressure obtained in chamber 25 corresponds substantially to that which it is desired to obtain in the brake cylinder 4, the brake valve handle 8 is turned from the application position to a lap position in which passage 26 is lapped by the rotary valve 5, as shown in Fig. 3 of the drawing. Then when the pressure obtained in the brake cylinder 4 and in chamber 27 acting on the right hand side of the application piston 20 slightly exceeds the control pressure in chamber 25, said piston is shifted towards the left hand, which permits the application valve 33 to seat and cut off further flow of fluid under pressure to the brake cylinder. It will, therefore, be evident that the pressure in chamber 25 may be increased in a series of successive steps, and that the application piston 20 and valve 33 will operate to provide corresponding successive steps of increase in pressure in the brake cylinder 4.

If the rate of increase in pressure in chamber 25, upon operation of the brake valve device 1, is more rapid than the build up pressure in the brake cylinder 4 and chamber 27, the application piston 20 will move into engagement with the raised portions 36, which prevents closing of the communication from chamber 27 to the plurality of passages 28, but if the capacity of the application valve is such as to permit the pressure in brake cylinder 4 and chamber 27 to increase at substantially the same rate as the pressure is increased in chamber 25, then it will be evident that the application piston may not engage the raised portions 36.

In effecting an application of brakes, fluid at the pressure in the brake cylinder 4 and acting in chamber 17, flows through the plurality of passages 22 to chamber 21 and therein acts on the left hand face of the release piston 19 over the area of said piston outside of the seat rib 23, but the actuating pressure in chamber 25, acting over a greater area of the release piston, maintains the seat rib 23 in sealing engagement with the gasket 14 and thereby prevents loss of fluid under pressure from the brake cylinder.

If it is desired to effect a release of the brakes after an application, the brake valve device 1 is turned to the release position, as shown in Fig. 1. In this position, fluid under pressure is vented from chamber 25 to the atmosphere through passage and pipe 26, cavity 38 in rotary valve 7 and through the atmospheric exhaust passage 39.

When the pressure in chamber 25 acting to hold the release piston 19 in its left hand position is thus reduced to slightly below the opposing pressure in chamber 21, said release piston is moved towards the right hand, thereby opening communication from chamber 21 to the atmospheric exhaust passage 24, through which communication fluid under pressure is permitted to flow from the brake cylinder 4 by way of pipe and passage 18, chamber 17 and the plurality of passages 22.

If only a partial release of the brakes is desired, then when the pressure in chamber 25 is reduced to a degree substantially equal to the degree of pressure it is desired to retain in the brake cylinder 4, the brake valve device 1 is turned from the release position to the lap position, in which passage 26 is lapped, which prevents further venting of fluid under pressure from the chamber 25. When the brake cylinder pressure acting in chamber 21 then reduces to a degree slightly below the pressure in chamber 25, the piston 19 is moved towards the left until the seat rib 23 seals against the gasket 14, which prevents further venting of fluid under pressure from the brake cylinder.

It will, therefore, be evident that by moving the brake valve device between release and lap positions, the pressure in chamber 25 can be reduced in steps if desired, and that the release piston 19 will operate according to the reduction in pressure in chamber 25 to permit corresponding steps of reduction in pressure in the brake cylinder 4.

It will be noted that the application and release valve device is simple and compact in construction, the working parts are readily accessible for inspection, cleaning or repairs and the device functions according to the control pressure applied in chamber 25 to promptly vary the pressure in brake cylinder 4.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. A valve device comprising a casing having a chamber open at one end and closed at the other end and a passage opening into the closed end of said chamber, a cover member closing the open end of said chamber and having a pressure chamber opening to the inner face of said cover, a gasket disposed in said casing around said passage, another gasket disposed against the inner face of said cover member around said pressure chamber, and a valve assembly disposed in said casing chamber and removable therefrom by hand, said valve assembly comprising a bushing disposed in said casing chamber with opposite ends in sealing engagement with said gaskets, said bushing having a bore open at one end to said passage, a partition wall adjacent the opposite end of said bore and having a central aperture open to said pressure chamber, a valve for controlling communication through said aperture, and a piston slidably mounted in said bore for controlling said valve.

2. A valve device comprising a casing having a chamber open at one end and closed at the other end and a passage opening into the closed end of said chamber, a cover member closing the open end of said chamber and having a pressure chamber opening to the inner face of said cover, a gasket disposed in said casing around said passage, another gasket disposed against the inner face of said cover member around said pressure chamber, a valve assembly disposed in said casing chamber and removable therefrom by hand, said valve assembly comprising a bushing disposed in said casing chamber with opposite ends in sealing engagement with said gaskets, said bushing having a bore open at one end to said passage, a partition wall adjacent the opposite end of said bore and having a central aperature open to said pressure chamber, a valve for controlling communication through said aperture, a piston slidably mounted in said bore for controlling said valve, and another piston slidably mounted in said bore and movable into engagement with the gasket at the closed end of said casing chamber for closing communication from said passage to the bore in said bushing.

JOHN F. CRAIG.